United States Patent
Kropp

(10) Patent No.: US 7,260,328 B2
(45) Date of Patent: Aug. 21, 2007

(54) OPTOELECTRONIC ASSEMBLY FOR MULTIPLEXING AND/OR DEMULTIPLEXING OPTICAL SIGNALS

(75) Inventor: Jörg-Reinhardt Kropp, Berlin (DE)

(73) Assignee: Finisar Corporation, Sunnyvale, CA (US)

( * ) Notice: Subject to any disclaimer, the term of this patent is extended or adjusted under 35 U.S.C. 154(b) by 334 days.

(21) Appl. No.: 10/372,992

(22) Filed: Feb. 24, 2003

(65) Prior Publication Data

US 2003/0152113 A1 Aug. 14, 2003

Related U.S. Application Data

(63) Continuation of application No. PCT/DE01/03234, filed on Aug. 22, 2001.

(30) Foreign Application Priority Data

Aug. 23, 2000 (DE) .................... 100 43 324

(51) Int. Cl.
*H04J 14/02* (2006.01)
*G02B 2/26* (2006.01)

(52) U.S. Cl. .................... 398/82; 385/47

(58) Field of Classification Search ............ 398/82–88; 385/47, 24
See application file for complete search history.

(56) References Cited

U.S. PATENT DOCUMENTS 4,011,005 A * 3/1977 Hawkes et al. ............... 385/46
4,244,045 A 1/1981 Nosu et al.
5,835,517 A * 11/1998 Jayaraman et al. ..... 372/50.124
5,894,535 A * 4/1999 Lemoff et al. ................ 385/47
6,170,996 B1 * 1/2001 Miura et al. .................. 385/94
6,198,864 B1 * 3/2001 Lemoff et al. ................ 385/47

FOREIGN PATENT DOCUMENTS

| EP | 0 174 130 A2 | 3/1986 |
| EP | 0 877 264 A3 | 10/1999 |
| EP | 1 004 907 A2 | 5/2000 |
| EP | 1 014 125 A2 | 6/2000 |
| FR | 2 539 518 A1 | 7/1984 |
| JP | 55025045 | 2/1980 |
| WO | 01/02887 A1 | 1/2001 |

OTHER PUBLICATIONS

Gottert et al., "Examples and Potential Applications of LIGA Components in Micro-Optics", from "Integrated Optics and Micro-Optics with Polymers", Edited by Ehrfeld et al., 1993 (provided by Applicant together with application).*
International Search Report of Application PCT/DE01/03234, Dec. 14, 2001 (provided by Applicant together with application).*

* cited by examiner

Primary Examiner—Jason Chan
Assistant Examiner—Quan-Zhen Wang
(74) Attorney, Agent, or Firm—Workman Nydegger

(57) ABSTRACT

An optoelectronic assembly multiplexes and/or demultiplexes optical signals. The assembly includes a monolithic multiplexer for multiplexing and demultiplexing optical signals, and two optical imaging systems for coupling light beams in or coupling them out of the multiplexer. The first optical imaging system is integrated in a single-channel interface and/or the second optical imaging system is integrated in a multi-channel interface, and at least one interface is directly linked with the multiplexer.

35 Claims, 2 Drawing Sheets

OPTOELECTRONIC ASSEMBLY FOR MULTIPLEXING AND/OR DEMULTIPLEXING OPTICAL SIGNALS

CROSS-REFERENCE TO RELATED APPLICATION

This application is a continuation of copending International Application No. PCT/DE01/03234, filed Aug. 22, 2001, which designated the United States and was not published in English.

BACKGROUND OF THE INVENTION

Field of the Invention

The invention relates to an optoelectronic assembly for multiplexing and/or demultiplexing optical signals. More specifically, the invention pertains to an optoelectronic assembly for multiplexing and/or demultiplexing optical signals, having:
- a monolithic multiplexing member for multiplexing and/or demultiplexing optical signals;
- a first optical imaging system that couples light beams of an optical channel with a multiplicity of wavelengths into and out of the multiplexing member; and
- a second optical imaging system, that couples light beams of a plurality of optical channels each having one wavelength into and/or out of the multiplexing member;
- the first optical imaging system is integrated into a single-channel interface member and/or the second optical imaging system is integrated into a multichannel interface member, and at least one interface member is connected directly to the multiplexing member.

It is known in optical telecommunications engineering to multiplex the data to be transmitted in order to transmit as large a data volume as possible via one optical waveguide. One possibility for this includes transmitting information with the aid of a plurality of wavelengths independently and simultaneously via one waveguide. It is necessary in this case for the signals from the various light sources to be combined at the transmitting end in one optical waveguide by using an optical multiplexer, and for the signals of various wavelengths from the incoming waveguide to be distributed at the receiving end into individual channels by using an optical demultiplexer for the purpose of separate detection.

In order to implement multiplexing or demultiplexing, it is known from European Patent Application No. EP 0 877 264, which corresponds to U.S. Pat. No. 5,894,535, to separate the individual wavelengths with interference filters. The high number of interference layers of the interference filters produce very steep spectral edges between transmission and reflection of different wavelengths. Only one specific wavelength is passed in this case by the interference filters, while the other wavelengths are reflected. A multiplicity of wavelength channels can be selected and/or combined by cascading such filters with individually distinguishable spectral transmission positions. The use of interference filters is extremely effective, particularly in the case of large wavelength spaces of 10 nm more between the individual channels.

Coupling light signals into and out of an assembly for the purpose of multiplexing and/or demultiplexing optical signals requires optical imaging systems that couple light beams of an optical channel with a plurality of wavelengths, or light beams of a plurality of optical channels with in each case only one wavelength into and out of multiplexing members.

SUMMARY OF THE INVENTION

It is accordingly an object of the invention to provide an optoelectronic assembly for multiplexing and/or demultiplexing optical signals that overcomes the hereinafore-mentioned disadvantages of the heretofore-known devices of this general type and that provides a compact, space-saving and stable configuration of the optical image systems for a multiplexing member.

With the foregoing and other objects in view, there is provided, in accordance with the invention, an optoelectronic assembly for multiplexing and demultiplexing optical signals. The optoelectronic assembly includes a monolithic multiplexing member, two optical imaging systems, an optical element, and an optically transparent sealing compound. The monolithic multiplexing member multiplexes and demultiplexes optical signals. The first optical imaging system couples light beams of an optical channel into and out of the multiplexing member. The second optical imaging system couples light beams of a plurality of optical channels into and out of the multiplexing member. At least one of the first optical imaging system and the second optical imaging system is integrated into an interface member. The interface member is a single-channel interface member when integrating the first optical imaging system, and the interference member is a multichannel interface member when integrating the second optical imaging system. The interface member is connected directly to the multiplexing member. The optically transparent sealing compound optically couples directly the interface member to the optical element and contains an optical path between the interface member and the optical element.

In accordance with a further object of the invention, the solution according to the invention is distinguished in that, in the case of an optoelectronic assembly having a first and a second optical imaging system and a monolithic multiplexing member, the first and/or the second optical imaging system is integrated into an interface member, and at least one interface member is connected directly to the multiplexing member.

Depending on whether the optical imaging system images light beams of an optical channel with signals of various wavelengths or light beams of a plurality of optical channels with in each case only one wavelength, the interface members are in this case a single-channel interface member or a multichannel interface member. Of course, both a single-channel interface member and a multichannel interface member are present.

The interface members are preferably configured as unipartite shaped pieces by precise molding methods such as injection molding from materials such as plastic or glass. The interface members preferably are formed from plastic, while the multiplexing members include glass or a vitreous material. The construction of the multiplexing member from glass has the advantage that the light to be separated in its individual wavelength or to be combined from individual wavelengths runs in an exceptionally homogeneous medium of low attenuation.

The construction of the interface members from plastic has the advantage that these members can be produced easily and, in particular, optical imaging elements can easily be implemented in or on these and/or optical imaging elements can be indicated in these.

The connection of an interface member to the multiplexing member is performed in a simple way by mounting it directly onto a flat surface of the multiplexing member. The two interface members are preferably mounted directly onto the multiplexing member, the interface members being advantageously disposed on opposite, parallel surfaces of the multiplexing member.

In a preferred refinement of the invention, the optical imaging systems of the two interface members are configured in such a way that the optical path through the multiplexing member occurs in a substantially parallel fashion. The traversing of the multiplexing member with parallel light has the advantage that wavelength-selective reflecting layers disposed on the multiplexing body. That is, the interference filters have particularly good properties in the case of transirradiation with virtually parallel light. That is, with high spatial resolution in each case, only one specific wavelength passes through, while the other wavelengths are reflected.

The optical paths through the interface members bordering the multiplexing member preferably run at an acute angle to the perpendicular to the parallel faces of the multiplexing member. This ensures that light coupled into the multiplexing member is multiply reflected to and fro in the latter such that the light coupled in or out can traverse a plurality of interference filters for the purpose of separating or combining the individual wavelengths (channels).

The multiplexing body preferably has two opposite, parallel surfaces. On at least one of the surfaces, wavelength-selective reflective surfaces are provided. The wavelength-selective reflective surfaces serve as interference filters and are respectively assigned to an optical path. The wavelength-selective reflective surfaces can in this case be applied directly to the surface. Alternatively, the wavelength-selective reflective surfaces are implemented on separate carrier parts that are disposed on the surface of the multiplexing member.

Furthermore, the multiplexing member preferably has, on at least one surface, reflective surfaces that are not wavelength selective. Consequently, a light beam coupled into the multiplexing member at an angle to the perpendicular is reflected to and fro multiply between the two parallel surfaces, the light beam being respectively coupled out with a wavelength component at the wavelength-selective reflective surfaces. The actual multiplexing and/or demultiplexing of the signals of various wavelengths is performed thereby. By contrast, the interface members ensure the optical coupling of respective optical paths to further optical elements such as optoelectronic transducers or waveguides.

One or more optical imaging elements or groups of optical imaging elements (lens and mirror, for example) are provided in the interface members, depending on whether only one channel or a plurality of channels are coupled into or out of the multiplexing member. The imaging elements can be implemented in various ways in the interface members. The optical imaging elements are preferably formed in the interface members by curved, lenticular surfaces that form, for example, the boundary surfaces with at least one cavity, which is constructed in the interface member. This has the advantage that there is no need to integrate additional lenses in the interface member.

Alternatively, the optical imaging elements are formed in the interface members by curved mirrors that are constructed, in particular, on subregions of an outer surface of the interface member. In order to be constructed as a reflecting mirror, the outer surfaces are preferably provided in this case with a reflecting layer.

It is likewise within the scope of the invention when the optical imaging elements are formed in the interface members by lenses and/or reflective surfaces that are integrated in the interface members.

In a preferred development of the invention, optical elements to be coupled to the optoelectronic assembly are optically coupled directly to the single-channel or multichannel interface member. The optical elements to be coupled are preferably optoelectronic transducers, each optoelectronic transducer being assigned an optical path of the multichannel interface member.

The optoelectronic transducers are configured in an array chip, for example. This configuration is advantageous, in particular, for the case when the optoelectronic transducers serve as receivers. In the case of transmitting elements, it will be sensible as a rule to provide separate transmitting element chips for the individual wavelengths.

The optoelectronic transducers ensure in a way known per se the conversion of optical into electric signals and/or the conversion of electric into optical signals.

In a preferred refinement, the invention provides that at least one interface member and the associated optical elements are at least partially jointly sheathed by an optically transparent sealing compound. As a result, the optoelectronic assembly and the optical elements to be coupled are encapsulated from the environment and thus protected from moisture, dirt, etc. This ensures that the optical path between the optoelectronic assembly and the optical elements to be coupled, which runs within the sealing compound, is not impaired.

An optoelectronic assembly in the case of which two interface elements with optical imaging elements are mounted directly onto a plane-parallel monolithic multiplexing member, and one and/or another of the interface members is connected to optical elements to be coupled by an optically transparent sealing compound for protection of the optical path makes available a high-quality, compact, space-saving configuration that is easy to produce and shielded against environmental influences.

It may be pointed out, moreover, that light can be coupled into and out of the optoelectronic assembly in the same planes, but also in planes disposed differently relative to one another. For example, light coupled into the assembly in a specific direction is coupled out at an angle of 90° to the coupling-in direction.

In an advantageous development of the invention, the single-channel and/or multichannel interface member is formed in such a way that it fashions receptacles or other mechanical mounts for coupling optical elements. In particular, the interface member forms a receptacle for an optical plug, thus permitting an optical waveguide that is to be coupled to be aligned without adjustment.

In an alternative refinement of the invention, the two interface members are disposed on one side of the multiplexing member. Light is thus coupled into and out of the multiplexing member on the same side. The two interface members are disposed next to one another in this case. In a development of this alternative of the invention, the two interface members are additionally configured in a unipartite fashion; that is, the respective optical imaging systems of the two interface members are integrated into one part.

Other features that are considered as characteristic for the invention are set forth in the appended claims.

Although the invention is illustrated and described herein as embodied in a optoelectronic assembly for multiplexing and/or demultiplexing optical signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
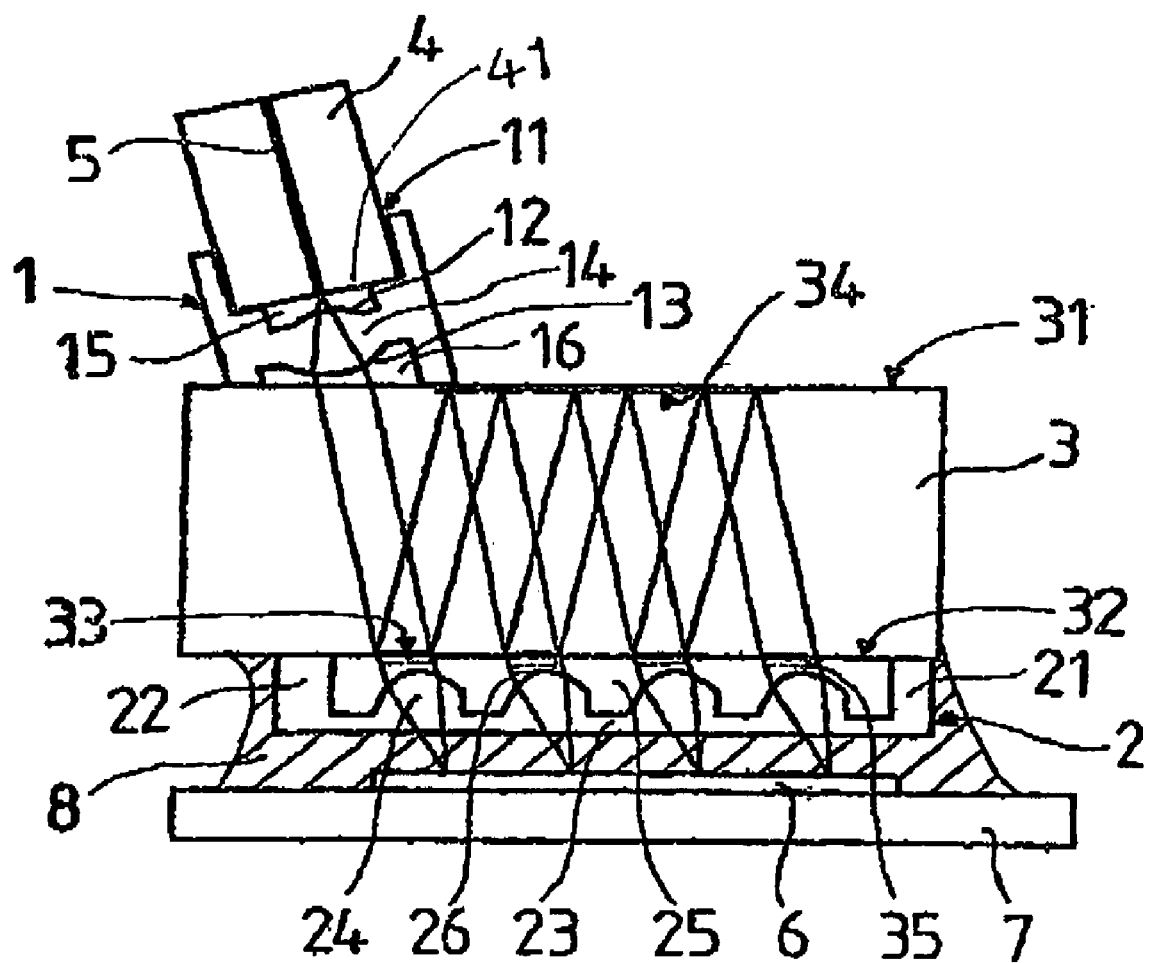
FIG. 1 is a diagrammatic side view showing a first exemplary embodiment according to the invention of an optoelectronic assembly for multiplexing and/or demultiplexing optical signals, optical signals in the same plane being coupled into and out of the optoelectronic assembly.

Referring now to the figures of the drawings in detail and first, particularly to FIG. 1 thereof, there is shown an optoelectronic assembly having a first interface member 1, a second interface member 2, and a multiplexing member 3 that is disposed between the first and the second interface members 1, 2.

On its side opposing the multiplexing member 3, the interface member 1 has a receptacle 11 for a support member 4, in which there is constructed an optical channel or optical path 5 that is formed by an optical waveguide.

The first interface member 1 has two curved surfaces 12, 13 that together fashion a lens 14. The lens surfaces in this case respectively border a cavity 15, 16 that is constructed between the lens 14 and the support member 4 or the lens 14 and the multiplexing member 3.

The effect of the lens 14 is that divergent light emerging from the optical channel or optical waveguide 5 at the plane end face 41 of the support member 4 is projected to form a parallel light beam that is then coupled into the multiplexing member 3 at an acute angle to the perpendicular to the bordering surface 31 of the multiplexing member 3.

Just like the second interface 2, the first interface 1 is formed from a plastic, in particular a polymer material such as polycarbonate, for example. It is produced, for example, using an injection molding method.

The multiplexing member 3 has two plane-parallel surfaces 31, 32, and is formed by a monolithic glass body. On its surface 31 next to the entrance face of the parallel light beam, the multiplexing member 3 has a silvering 34 that reflects light beams of all wavelengths.

By contrast, at regular spacings the opposite surface 32 of the multiplexing member 3 has interference filters 33 that are transparent to light of a specific, in each case different wavelength, but reflect all other wavelengths.

The result of this is that light coupled into the multiplexing member 3 via the interface member 1 is reflected to and fro between the two faces 31, 32, one wavelength component being coupled out in each case at the interference filters 33. Consequently, a multiplicity of optical paths or channels that in each case have light signals of a specific wavelength emerge from the multiplexing member 3.

Light emerging from the multiplexing member 3 is coupled directly into the second interface member 2. The latter has in the sectional view of FIG. 1 two U-shaped limbs 21, 22 between which a baseplate 23 extends. A cavity 25 is formed between the baseplate 23, the lateral limbs 21, 22 and the surface 32 of the multiplexing member 3. Material projections with curved, lenticular surfaces 26 that respectively fashion a lens 24 extend on the baseplate 23 in the direction of the multiplexing member 3 at regular spacings. In this configuration, the individual lenses 24 are assigned in each case to an optical channel emerging from the multiplexing member 3.

In an alternative refinement, the interference filters are not implemented directly on the surface 32 of the multiplexing member 3, but on separate support parts 35 (illustrated schematically by dashed lines FIG. 1) that are disposed on the surface 32 of the multiplexing member 3 and project slightly into the cavity 25. The interference filters can be produced more simply and cost-effectively in this way.

Of course, the optoelectronic assembly described can be disposed both at the transmitting end and at the receiving end of a light transmission link. Depending on the direction of the light signals, light of a plurality of wavelengths of the optical channel 5 is separated into a multiplicity of optical channels each having only one wavelength (that is to say the light transverses the assembly in the illustration of FIG. 1 from top to bottom and serves in the process as a demultiplexer or receiver), or light of a multiplicity of channels of different wavelength is combined by the multiplexing member 3 to form the optical channel 5 (that is to say the light transverses the assembly of FIG. 1 from bottom to top, the assembly serving as a multiplexer or transmitter).

An array chip with a plurality of optoelectronic transducers is assigned to the second interface member 2. In each case, one optoelectronic transducer is assigned to an optical channel emerging from the second interface member or entering into the latter. This array chip 6 is disposed on a substrate 7 in a way known per se. The optoelectronic transducers are, for example, light-emitting diodes or semiconductor lasers. Light emerging vertically upward is guided via the interface member 2 into the multiplexing member 3 and further into the interface member 4 and the optical channel 5. Alternatively, receiving elements such as photodiodes are involved, which convert the light of the individual optical channels into electric signals.

Alternatively, the optoelectronic transducers are not disposed on an array chip, but on separate chips.

The array chip 6, the substrate 7, and the second interface member 2 are transparently sealed by an optical sealing compound 8 and thereby protected against environmental influences such as moisture and dust. The optical path between the array chip 6 and the second interface member 2 runs in this case in the sealing compound 8. It is therefore optimally shielded against the outside.

If the optoelectronic transducers are transmitting elements such as light-emitting diodes or semiconductor lasers, it is to be ensured that the light they emit is coupled into the multiplexing member 3 in an angular fashion. This is possible, for example, by illuminating the lenses 24 of the second interface member 2 obliquely or angularly with light. A further possibility includes providing a sawtooth construction of the underside of the baseplate 23 or the boundary surface between the sealing compound 8 and the second interface member 2 in order to create boundary surfaces that refract the light in an angular fashion into the interface member 2 and onto the lenses 24 (not illustrated). The sealing compound 8 and the second interface member 2 would have to exhibit a different refractive index for this case.

Figure 2:
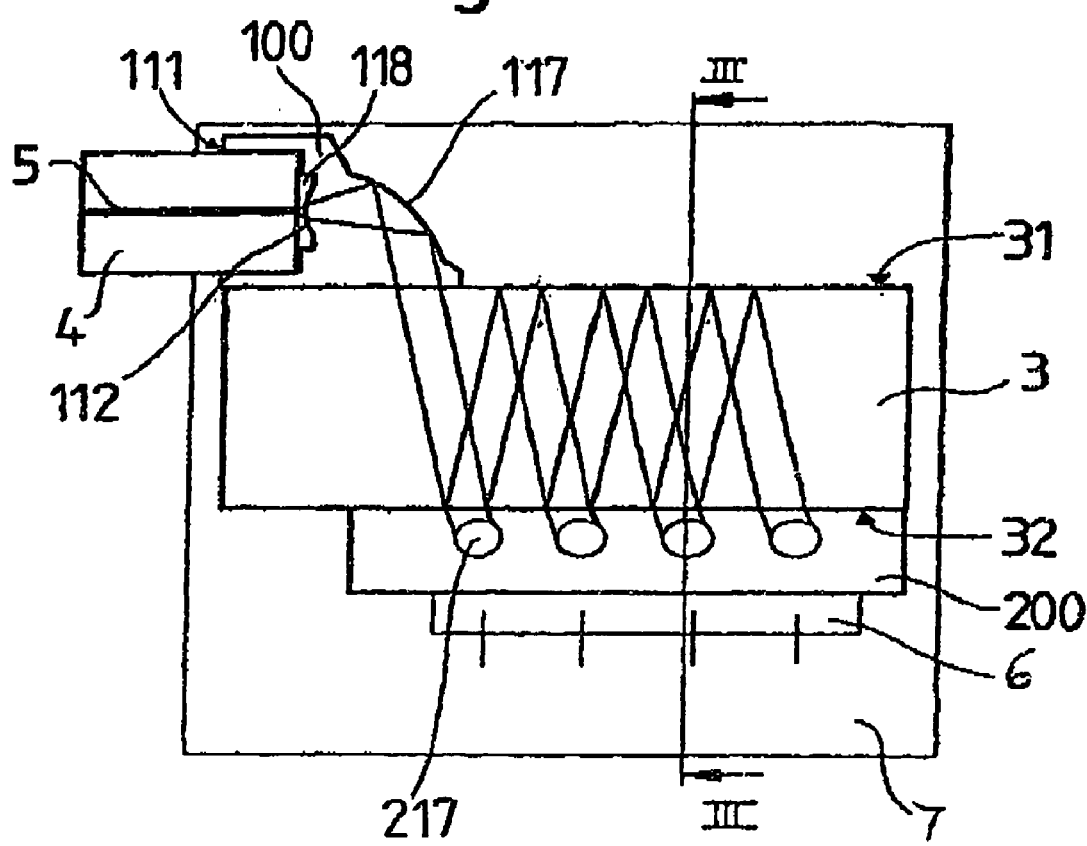
FIG. 2 is a diagrammatic plan view showing a second exemplary embodiment of an optoelectronic assembly, in the case of which optical signals are coupled in and out in different planes.
Figure 3:
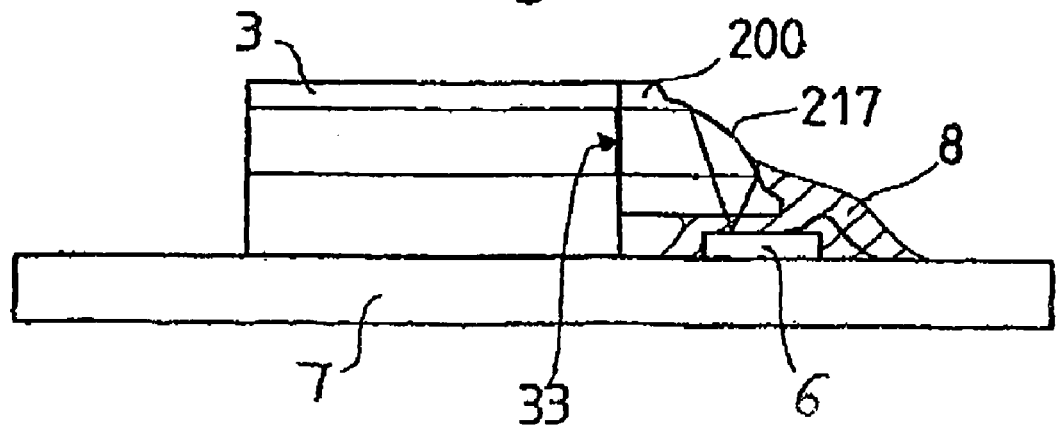
FIG. 3 is a sectional view of the optoelectronic assembly of FIG. 2 taken along the section line III-III.

An alternative exemplary embodiment of the optoelectronic assembly according to the invention is illustrated in FIGS. 2 and 3. The basic structure of a multiplexing member 3 having two plane-parallel surfaces 31, 32 to which in each case a first interface member 100 and a second interface member 200 are directly coupled corresponds to the structure of FIG. 1. The difference between the exemplary embodiment of FIG. 2 and the exemplary embodiment of FIG. 1 lies in that the light is coupled into or out of the second interface member 200 in a plane perpendicular to the plane of the drawing of FIG. 2, and the optical imaging elements of the interface members 100, 200 have curved mirrors.

The first interface element 100 has, again, a receptacle 111 for coupling a support member 4. The support member 4 is, for example, an optical plug.

A cambered surface 112 of the interface member 100, which borders a cavity 118, serves as a positive lens that reduces the degree of divergence of the emerging light. The interface member 100 also has a curved mirror 117 that is constructed on an outer face of the interface member 100. The outer face is provided in this case with a reflecting layer (not illustrated separately), and so a light beam penetrating into the interface member 100 is reflected at the curved mirror 117.

The effect of the configuration illustrated is that a divergent light beam emerging from the optical waveguide 5 of the support member is reflected at the mirror 117 in such a way that a parallel light beam is coupled into the multiplexing member 3.

In accordance with FIG. 3, an optical configuration similar to FIG. 2 is shown except the optical configuration of the interface member 100 is constructed in the interface member 200. Thus, light emerging from the multiplexing member 3 is reflected downward in the direction of the optoelectronic array chip 7 via a curved mirror 217 that is fashioned on the outer surface of the interface member 200. In this case, the reflective surface 217 concentrates light incident from the multiplexing member 3 in the direction of the array chip with the optoelectronic transducer.

The array chip 7, the substrate 6, and the second interface element 200 are, in turn, sheathed by an optically transparent sealing compound 8 such that the complete optical path is shielded from the environment. The beam path between the interface member 200 and array chip 7 lies within the sealing compound. No further protection of the configuration from the outside is therefore required.

The invention is not limited in its construction to the exemplary embodiments illustrated above. All that is essential for the invention is that at least one of the two optical imaging systems responsible for coupling light into and out of the multiplexing member is integrated into an interface member, and that this interface member is directly connected to the multiplexing member.

I claim:

1. An optoelectronic assembly for multiplexing and/or demultiplexing optical signals, comprising:
   a monolithic multiplexing member for multiplexing and/or demultiplexing optical signals, wherein said multiplexing member has opposing parallel and substantially planar surfaces;
   a first optical imaging system for coupling light beams having light of multiple combined frequencies between an optical channel and said multiplexing member;
   a second optical imaging system for coupling light beams each having one wavelength with said multiplexing member;
   said first optical imaging system being integrated into a single-channel interface member and said second optical imaging system being integrated into a multi-channel interface member, said interface members being connected directly to said multiplexing member, wherein the interface members are disposed on opposite surfaces of the opposing parallel substantially planar surfaces of said multiplexing member;
   at least one optical element;
   an optically transparent sealing compound optically coupling directly said multi-channel interface member to said at least one optical element and containing an optical path between said multi-channel interface member and said at least one optical element; and
   said interface members being constructed as unipartite shaped pieces.

2. The optoelectronic assembly according to claim 1, wherein said optical imaging systems of said two interface members locate the optical path through said multiplexing member in a substantially parallel fashion.

3. The optoelectronic assembly according to claim 1, wherein:
   each of said interface bodies members have an optical path; and the optical paths through said two interface bodies members occur at an acute angle to a perpendicular to said parallel faces of said multiplexing member.

4. The optoelectronic assembly according to claim 3, wherein:
   said multiplexing member has two opposing parallel surfaces;
   a wavelength-selective reflective surface is disposed on at least on one of said surfaces of said multiplexing member; and
   said wavelength-selective reflective surface is assigned to a respective optical path.

5. The optoelectronic assembly according to claim 4, wherein:
   said multiplexing member has a plurality of separate carrier parts located on said surface with said reflective surface; and
   at least one reflective surface is implemented on each of said separate carrier parts.

6. The optoelectronic assembly according to claim 4, wherein said multiplexing member has, on at least one of said surfaces, a non-wavelength selective reflective surface.

7. The optoelectronic assembly according to claim 4, wherein:
   said multiplexing member receives a parallel light beam via said single-channel interface member at an acute angle and multiply to and fro between said two parallel surfaces; and said wavelength-selective reflective surfaces couples the light beam respectively with a wavelength component.

8. The optoelectronic assembly according to claim 1, wherein said second optical imaging system has a plurality of optical imaging elements, one of said optical imaging elements being assigned to an optical channel of said multi-channel interface member with light signals of one wavelength.

9. The optoelectronic assembly according to claim 8, wherein said optical imaging elements are formed in said multi-channel interface member by curved, lenticular surfaces.

10. The optoelectronic assembly according to claim 9, wherein said lenticular surfaces form said boundary surfaces with at least one cavity constructed in the interface body.

11. The optoelectronic assembly according to claim 9, wherein:
said multi-channel interface member has a frame part with a U-shaped section having limbs, said frame part being connected at said limbs to said surface of said multiplexing member;
said limbs forming a cavity between said surface of said multiplexing member; and
curved, lenticular surfaces of said interface member being constructed at regular spacings in said cavity.

12. The optoelectronic assembly according to claim 8, wherein said optical imaging elements are formed in said multi-channel interface member by curved mirrors.

13. The optoelectronic assembly according to claim 12, wherein said curved mirrors are constructed on subregions of an outer surface of said multi-channel interface member.

14. The optoelectronic assembly according to claim 8, wherein said optical imaging elements in said multi-channel interface member include at least one of lenses and reflective surfaces.

15. The optoelectronic assembly according to claim 1, wherein said first imaging system of said single-channel interface member has an optical imaging element assigned to an optical channel with light signals of different wavelengths.

16. The optoelectronic assembly according to claim 15, wherein said optical imaging element is formed in said single-channel interface member by a curved mirror.

17. The optoelectronic assembly according to claim 16, wherein said curved mirror is constructed on a subregion of an outer surface of said single-channel interface member.

18. The optoelectronic assembly according to claim 15, wherein said optical imaging element in said single-channel interface member includes a lens or a reflective surface.

19. The optoelectronic assembly according to claim 15, wherein the optical imaging element assigned to the optical channel with light signals of different wavelengths is a lens configured to receive divergent light and form a parallel light beam from the divergent light that is coupled into the monolithic multiplexing member.

20. The optoelectronic assembly according to claim 1, wherein said multiplexing member is formed entirely of glass.

21. The optoelectronic assembly according to claim 1 wherein said multiplexing member is formed entirely of a vitreous material.

22. The optoelectronic assembly according to claim 1 wherein said multi-channel interface member is formed from a plastic.

23. The optoelectronic assembly according to claim 1, wherein said single-channel interface member is formed from a plastic.

24. The optoelectronic assembly according to claim 1, wherein said at least one optical element is an optoelectronic transducer or optoelectronic transducers, each optoelectronic transducer being assigned an optical path of said multi-channel interface member.

25. The optoelectronic assembly according to claim 24, wherein said optoelectronic transducers are disposed in an array chip.

26. The optoelectronic assembly according to claim 1, wherein said light beam is coupled in an identical plane.

27. The optoelectronic assembly according to claim 1, wherein said light beam is coupled into and out of the optoelectronic assembly in different planes disposed at an angle to one another.

28. The optoelectronic assembly according to claim 27, wherein said angle is 90°.

29. The optoelectronic assembly according to claim 1, wherein said single-channel interface member fashions a receptacle for coupling optical elements.

30. The optoelectronic assembly according to claim 29, wherein said single-channel interface member fashions a receptacle for an optical plug.

31. The optoelectronic assembly according to claim 1, wherein said single-channel interface member fashions a mechanical mounting device for coupling optical elements.

32. The optoelectronic assembly according to claim 1, wherein the single channel interface includes a receptacle for receiving an optical waveguide.

33. The optoelectronic assembly according to claim 32, wherein the receptacle is defined by a curved surface of a lens.

34. The optoelectronic assembly according to claim 33, wherein the lens borders a cavity that is constructed between the lens and a support member or the lens and the monolithic multiplexing member.

35. The optoelectronic assembly according to claim 1, wherein the optically transparent sealing compound further provides mechanical support between the at least one optical element and the monolithic multiplexing member.

* * * * *

UNITED STATES PATENT AND TRADEMARK OFFICE
CERTIFICATE OF CORRECTION

PATENT NO. : 7,260,328 B2
APPLICATION NO. : 10/372992
DATED : August 21, 2007
INVENTOR(S) : Kropp It is certified that error appears in the above-identified patent and that said Letters Patent is hereby corrected as shown below:

Column 1
Line 62, after "10 nm" insert --or--

Column 4
Line 65, before "optoelectronic" change "a" to --an--

Column 6
Line 43, change "interface" to --support--

Column 7
Line 31, after "member" insert --4--
Line 44, change "array chip 7, the substrate 6," to --array chip 6, the substrate 7,--
Line 48, after chip" change "7" to --6--
Line 49, after "compound" insert --8--

Column 8
Line 36, change "least on one" to --least one--

Signed and Sealed this

Twenty-third Day of September, 2008

JON W. DUDAS
*Director of the United States Patent and Trademark Office*